Figure 1:
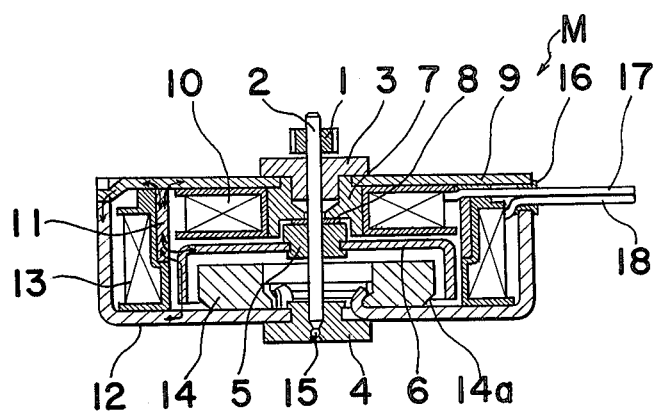

United States Patent [19]

Kuwako

[11] 4,100,443

[45] Jul. 11, 1978

[54] ELECTRICAL ROTARY MACHINE

[75] Inventor: Tomohisa Kuwako, Anjo, Japan

[73] Assignee: Kabushiki Kaisha Tokai Rika Denki Seisakusho, Japan

[21] Appl. No.: 694,334

[22] Filed: Jun. 9, 1976

[30] Foreign Application Priority Data

Aug. 13, 1975 [JP] Japan .................................. 50-98327

[51] Int. Cl.² ............................................. H02K 21/36
[52] U.S. Cl. .................................... 310/164; 310/266; 310/154
[58] Field of Search .............................. 310/152–154, 310/162–165, 40 MM, 49, 263, 181, 266

[56] References Cited

U.S. PATENT DOCUMENTS

| 3,508,091 | 4/1970 | Kavanaugh | 310/164 X |
| 3,555,325 | 1/1971 | Inariba | 310/266 X |
| 3,571,638 | 3/1971 | Inariba | 310/164 X |
| 3,684,907 | 8/1972 | Hinachi et al. | 310/164 X |
| 3,904,902 | 9/1975 | Inariba | 310/154 X |
| 3,984,709 | 10/1976 | Kuwako et al. | 310/154 X |
| 4,009,406 | 2/1977 | Inariba | 310/164 |

Primary Examiner—Donovan F. Duggan
Attorney, Agent, or Firm—Craig & Antonelli

[57] ABSTRACT

An electrical rotary machine or motor having one rotor on which a plurality of stages of pole teeth corrresponding in number to the number of phases are formed, with magnetic flux being supplied thereto through individual annular exciting coils corresponding in number to the number of the phases for rendering the motor to operate in polyphases.

9 Claims, 34 Drawing Figures

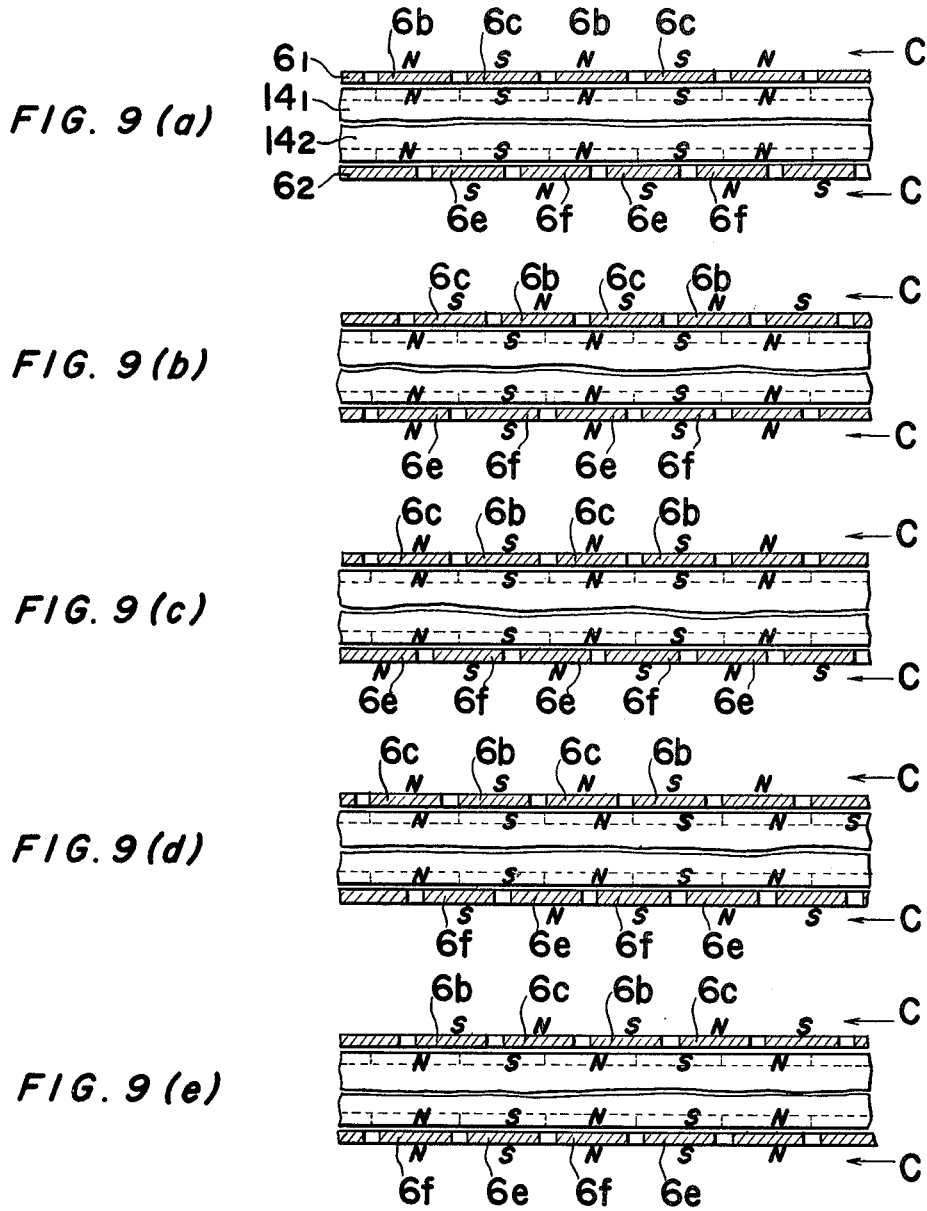
FIG. 9(a)
FIG. 9(b)
FIG. 9(c)
FIG. 9(d)
FIG. 9(e)
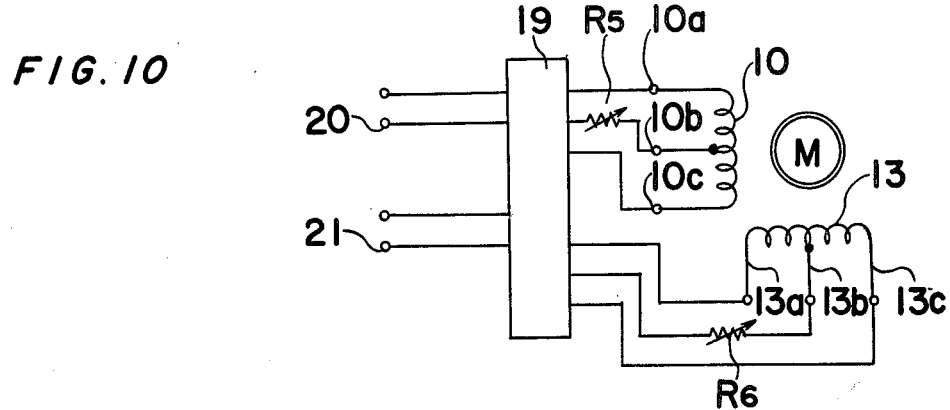
FIG. 10

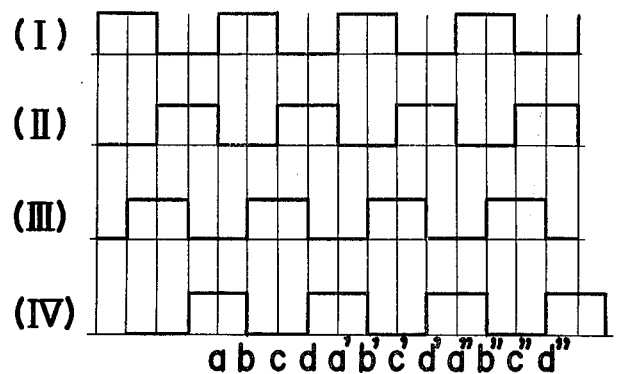
FIG. 11
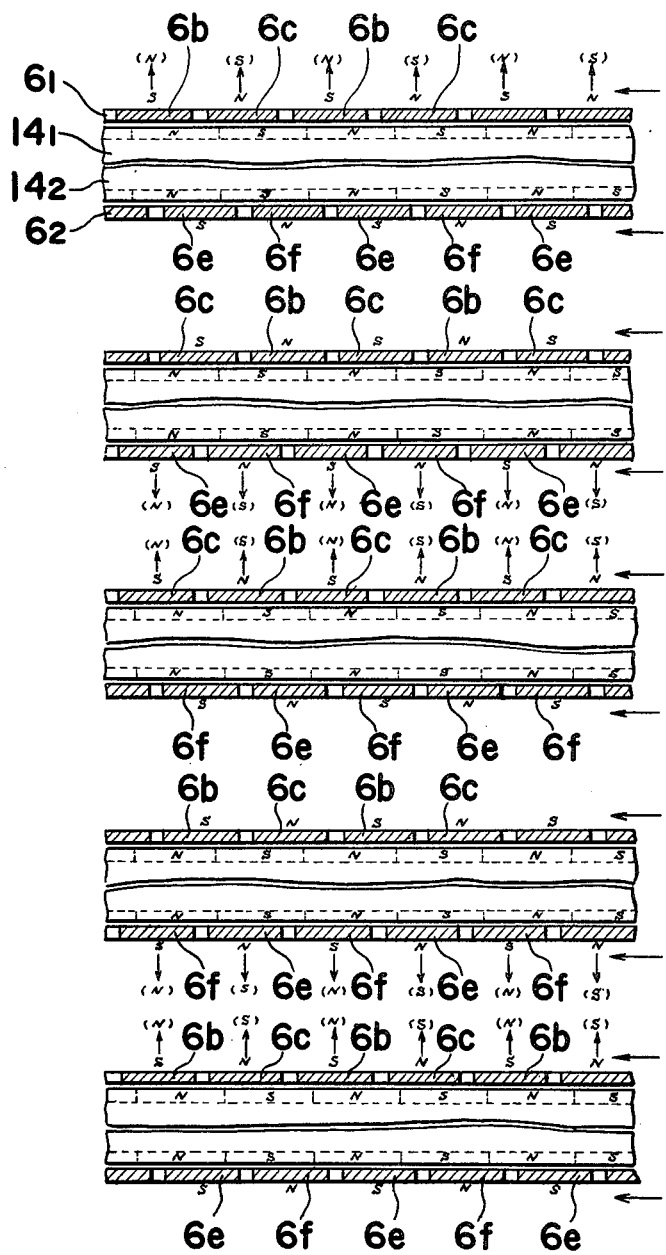
FIG. 12 (a)
FIG. 12 (b)
FIG. 12 (c)
FIG. 12 (d)
FIG. 12 (e)

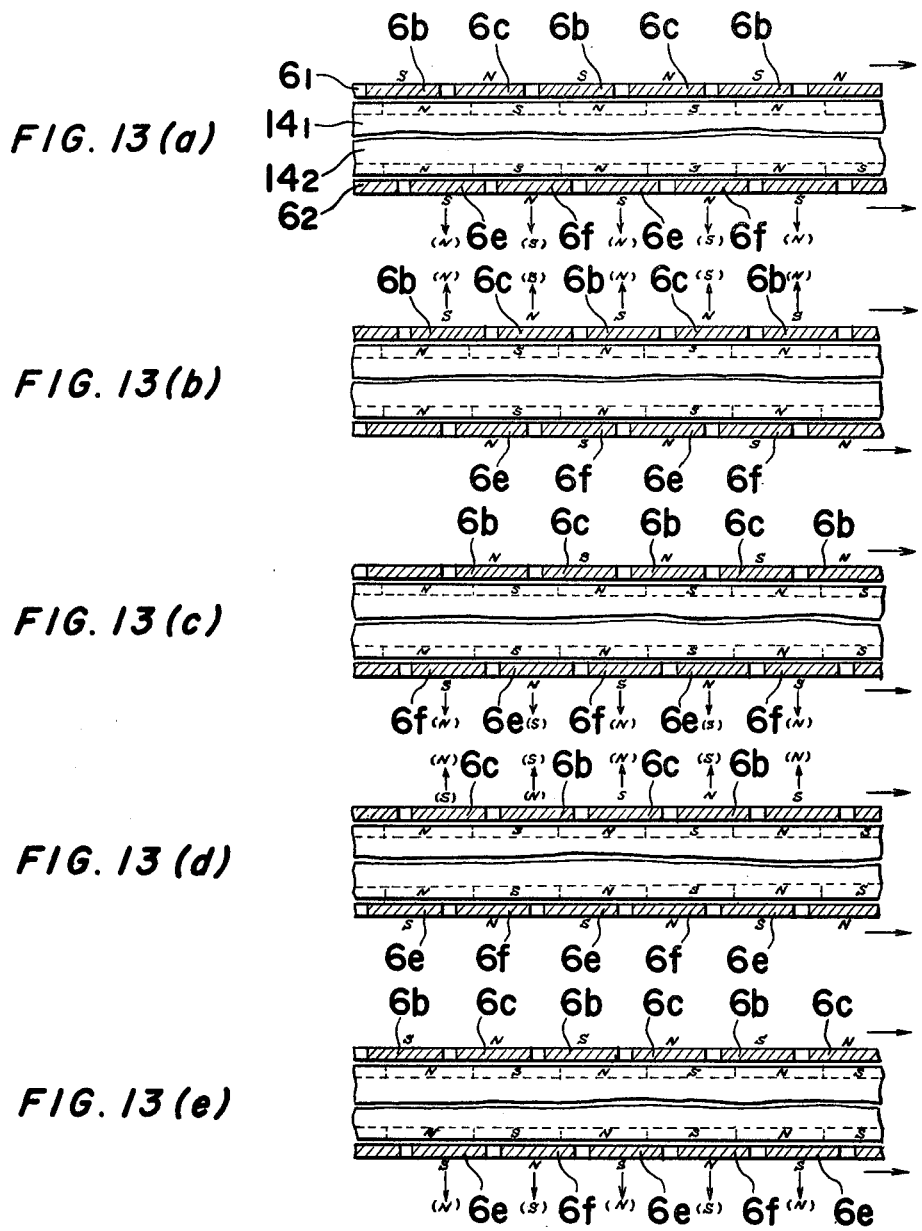
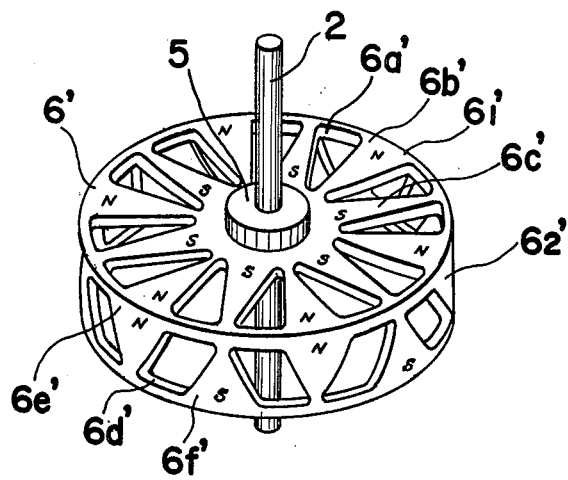

ELECTRICAL ROTARY MACHINE

The present invention relates to an electrical rotary machine and more particularly, to an improved electrical rotary machine having polyphase construction with only one rotor.

Conventionally, there have been various types of two-phase electrical rotary machines, for example, those including two rotors fixed on a rotary shaft in a concentric relation therewith, and corresponding sets of stators and annular exciting coils arranged also in concentric relation to the rotors at suitable electrical angles either in simply parallel relation to each other or in symmetrically parallel relation to each other, or those having the annular exciting coils in common, most of which arrangements have been proposed by the present inventor and disclosed, for example, in Japanese Patent laid open Publications Nos. 50/114519 and 50/114520.

The conventional electrical rotary machines or motors of the above described type, although superior in output efficiency and frequency response with other merits of their own, still have such disadvantages that two rotors are inevitably required therefor, which arrangement makes it necessary in the assembling of the rotary machines to fix the rotors to the rotary shaft, with the angle of the pole teeth between the two rotors being maintained extremely accurately, thus not only requiring much time in the assembling process, but increasing the possibilities for producing defective products. Furthermore, employment of the two rotors tends to increase the thickness of the motors in an axial direction of the rotors, thus hampering reduction in size of such motors.

Accordingly, an essential object of the present invention is to provide an electrical rotary machine having one rotor on which a plurality of stages of pole teeth corresponding in number to the number of the phases are formed, with magnetic flux being supplied thereto through individual annular exciting coils corresponding in number to the number of the phases for rendering the rotary machine to operate in polyphases.

Another important object of the present invention is to provide an electrical rotary machine of the above described type which is accurate in functioning and simple in construction with consequent facilitation of assembling process thereof for reduction in manufacturing cost.

A still further object of the present invention is to provide an electrical rotary machine of the above described type which is compact in size and whose concept is readily applicable to various types of motors, depending on the end uses.

According to a preferred embodiment of the present invention, the electrical rotary machine or motor includes a rotary shaft, one rotor which has pole teeth formed thereon in a plurality of stages corresponding in number to the phases and which is fixed to said rotary shaft in a concentric relation therewith, a plurality of annular exciting coils corresponding in number to the phases and provided at one side of the rotor in position corresponding to the pole teeth at each stage of the rotor, a magnetic stator concentric with the rotary shaft and magnetized radially to provide north and south poles alternating at equal angular spacings which correspond to the pole teeth of each stage of the rotor, and member for causing magnetic flux from each of the annular exciting coils to form magnetic loops individually flowing through the pole teeth at each stage of the rotor, by which arrangement, construction of the motor, especially, of the rotor is much simplified, with consequent facilitation in the manufacturing process thereof. Furthermore, the motor can be made compact in size through employment of one rotor, with substantial elimination of disadvantages inherent in the conventional electrical rotary machines.

Figure 2:
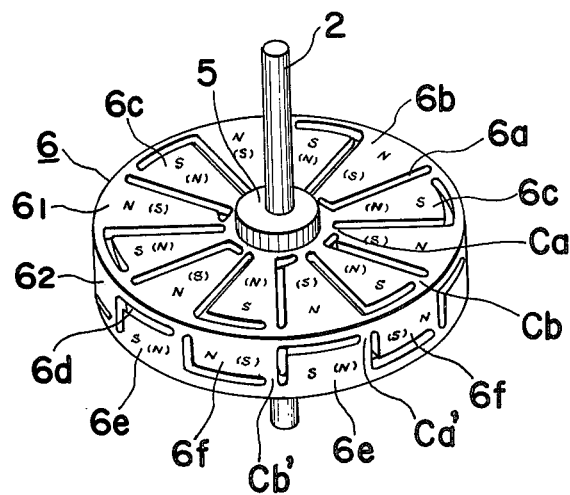
Figure 3:
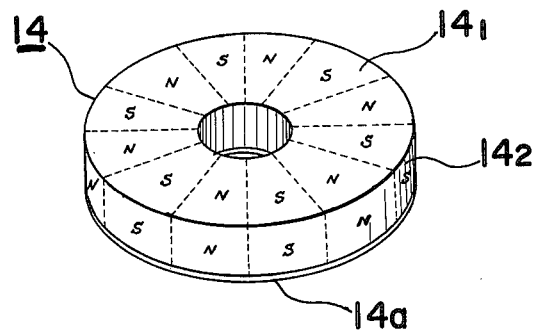
Figure 4:
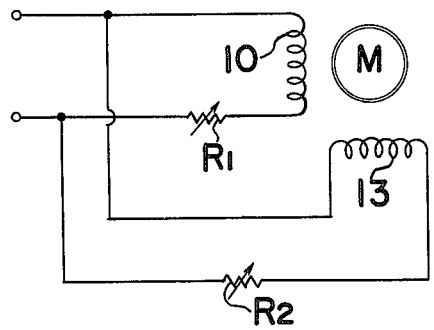
Figure 5A:
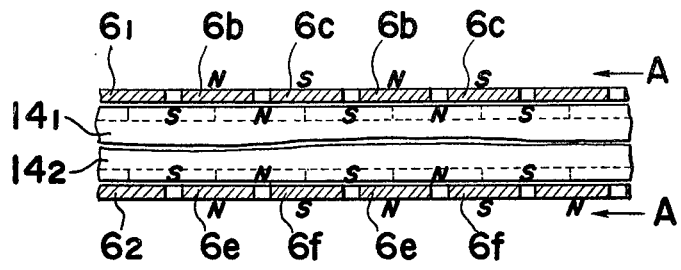
Figure 5B:
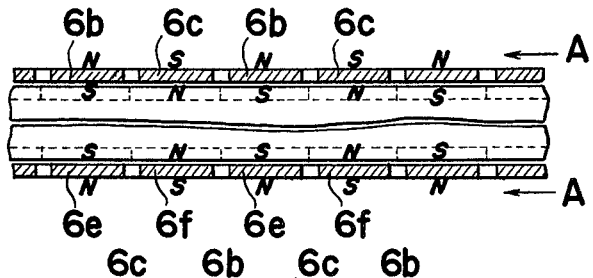
Figure 5C:
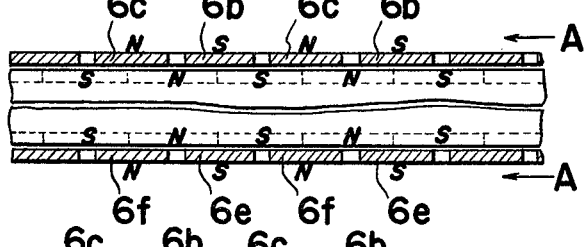
Figure 5D:
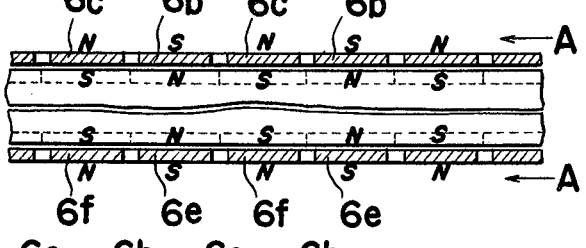
Figure 5E:
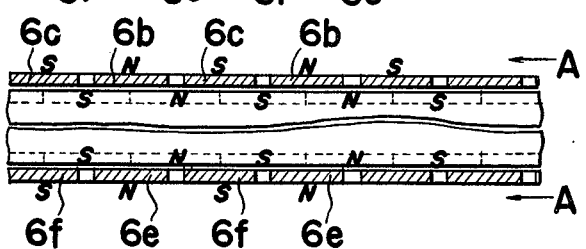
Figure 6:
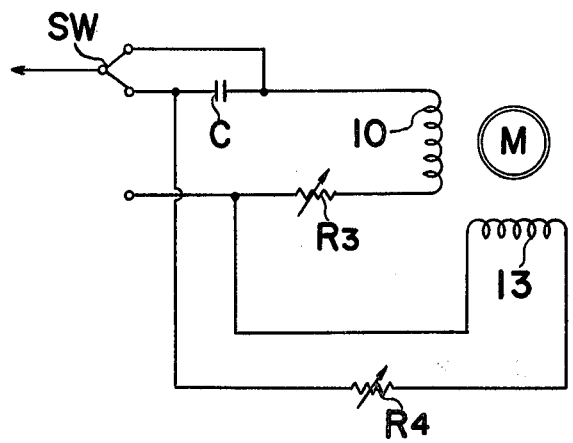
Figure 7:
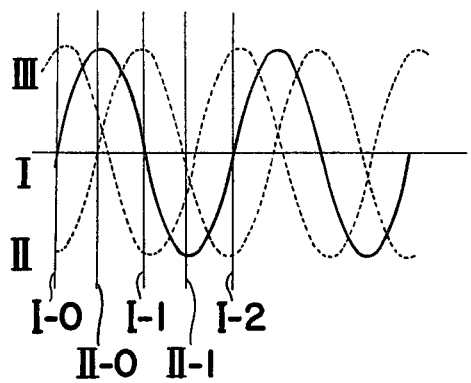

These and other objects and features of the present invention will become apparent from the following description taken in conjunction with a preferred embodiment thereof with reference to the attached drawings in which;

FIG. 1 is a sectional view of an electrical rotary machine according to one embodiment of the present invention, FIG. 2 is a perspective view of a rotor employed in the rotary machine of FIG. 1, FIG. 3 is a perspective view of a permanent magnet stator employed in the rotary machine of FIG. 1, FIG. 4 is an electrical wiring diagram of exciting coils employed in the rotary machine of FIG. 1 used as a two-phase synchronous motor, FIGS. 5(a) to 5(e) are diagrams explanatory of magnetic operation of the rotary machine of FIG. 4, FIG. 6 is an electrical wiring diagram of exciting coils employed in the rotary machine of FIG. 1 used as a reversible motor, FIG. 7 shows waveforms of current flowing through respective exciting coils of FIG. 6, FIGS. 8(a) to 9(e) are diagrams explanatory of magnetic operation of the rotary machine of FIG. 6, FIG. 10 is an electrical wiring diagram of exciting coils employed in the rotary machine of FIG. 1 used as a two-phase pulse motor, FIG. 11 shows waveforms of input signals to be applied to the rotary machine of FIG. 10, FIGS. 12(a) to 13(e) are diagrams showing magnetic operation of the rotary machine of FIG. 10, and FIG. 14 is a similar view to FIG. 2, but particularly shows a modification thereof.

Before the description of the present invention proceeds, it is to be noted that like parts are designated by like reference numerals throughout several views of the attached drawings.

Referring to FIGS. 1 to 4, there is shown in FIG. 1 a two-phase electric motor M employing one rotor according to one embodiment of the present invention. The motor M includes a rotary shaft 2 rotatably supported by a first bearing 3 and a second bearing 4, and having a boss member 5 of a soft magnetic material fixed to the central portion thereof, to which boss member 5, a rotor 6 is secured in a concentric relation therewith. The rotor 6 is made of an annular iron piece of a soft magnetic material, and formed with an inner periphery and an outer periphery bent to extend along the shaft 2, while the same rotor 6 is fixed at the inner periphery thereof to the boss member 5 to form a rotor assembly, thus the rotor 6 having a circular flat body portion $6_1$ which lies in a radial plane perpendicular to the axis of the shaft 2 and an extension $6_2$ extending in a direction parallel to the axis of the rotary shaft 2 from the outer peripheral edge of the circular portion $6_1$ as shown in FIG. 2. The flat body portion $6_1$ is provided with a plurality of slits or grooves 6a of high magnetic reluctance formed in L-shape and radially disposed reversing alternatingly in a circumferential direction to form pole teeth 6b and 6c, while the extension $6_2$ is also circumferentially divided into a plurality of pole teeth 6e and 6f at equal angular spacings by similar slits or grooves 6d corresponding in number to the grooves 6a in the circular body portion $6_1$ as in FIG. 2. Bridge portions Ca and Cb, and Ca' and Cb' across the ends of the respective neighboring grooves 6a and 6d are formed sufficiently narrow to provide magnetic saturation for enabling possible short circuits of magnetic flux therethrough to be neglected i.e., to provide high magnetic reluctance between the adjacent pole teeth, while keeping sufficient mechanical strength for bridging the adjacent pole teeth 6b and 6c, and also 6e and 6f. Accordingly, the respective pole teeth 6b and 6c on the circular body portion $6_1$ of the rotor 6 are in the same electrical phasial positions or staggered by an electrical angle of 90° with respect to the pole teeth 6e and 6f on the extension $6_2$ of the rotor 6. The number of the pole teeth 6b and 6c is the same as that of the pole teeth 6e and 6f. It should be noted here that although the pole teeth 6b, 6c, 6e and 6f are formed at equal angular spacings in FIG. 2, some of them may be omitted. Depending on necessity, one of the set of pole teeth 6b and 6c and the set of pole teeth 6e and 6f may be ordinary pole teeth which are not magnetized in opposite polarities simultaneously.

Between a washer 8 and the first bearing 3, there is provided a first yoke 7 of a soft magnetic material, to which yoke 7, a disk-shaped first casing member 9 of a similar soft magnetic material and a first annular exciting coil 10 are secured, while a cylindrical second yoke 11 of a soft magnetic material is fixed to the first casing member 9. A second casing member 12 made of a soft magnetic material is fixed at its inner periphery to the second bearing 4, with an outer periphery of the casing member 12 being bent to extend in the axial direction of the rotary shaft 2 so as to fit around the first casing member 9. In the space defined by the second casing member 12, the first casing member 9 and the second yoke 11, there is disposed a second annular exciting coil 13, while in the space surrounded by the second casing member 12 and the rotor 6, a permanent magnet stator 14 made of a hard magnetic material such as barium ferrite, strontium ferrite, alnico or the like is fixedly mounted with the recess of the cup-shaped rotor 6 overlying the top and side thereof as shown in FIG. 1.

The permanent magnet stator 14 of an annular shape has faces $14_1$ and $14_2$ each magnetized to provide north and south poles alternating at equal angular spacings at positions confronting the pole teeth 6b and 6c and the pole teeth 6e and 6f, respectively. Each pole on the magnetized upper face $14_1$ is aligned with respective pole on the magnetized peripheral face $14_2$ in the radial direction and is magnetized in a polarity same as or opposite to the polarity of the aligned pole on the upper face $14_2$. The second yoke 11 is provided between the exciting coils 10 and 13 to form two separate alternating magnetic circuits by the exciting coils 10 and 13. The peripheral edge 14a of the magnet stator 14 at the side of the second casing member 12 is bevelled as shown for reducing magnetic interference at the extension $6_2$ of the rotor 6. In the second bearing 4, a steel ball 15 rotatably supports one end of the rotary shaft 2, while an output gear 1 is secured to the other end of the shaft 2 extending through the first bearing 3. A bush 16 is fitted in an opening formed in the second casing member 12 in a position adjacent to the first casing member 9 for passing leads 17 and 18 from the first and second annular exciting coils 10 and 13 therethrough.

The extension $6_2$ of the rotor 6 and accordingly the pole teeth 6e and 6f may be formed in the same plane as the circular portion $6_1$ of the rotor 6. In this case, the permanent magnet stator 14 is magnetized at positions facing the pole teeth 6b and 6c and the pole teeth 6e and 6f, respectively and the annular exciting coils 10 and 13 are disposed concentrically with the rotary shaft 2 at positions facing the pole teeth 6b and 6c and the pole teeth 6e and 6f, respectively, opposite to the magnetized faces $14_1$ and $14_2$ of the stator 14 with reference to the rotor 6.

In the electric motor of the above described construction, when a commercial frequency voltage is applied to the first and second annular exciting coils 10 and 13 respectively, alternating magnetic flux is produced by electric current flowing therethrough. The magnetic flux developed by the first annular exciting coil 10 forms a magnetic circuit including the first casing member 9, the first yoke 7, the boss member 5 of the rotor 6, the circular flat body portion $6_1$ of the rotor 6 and the second yoke 11, while the magnetic flux produced by the second annular exciting coil 13 also forms a magnetic circuit including the first casing member 9, the second yoke 11, the peripheral extension $6_2$ of the rotor 6 and the second casing member 12. Accordingly, in a given half cycle of the power supply voltage, if the magnetic flux arising from the first annular exciting coil 10 flows, for example, through the flat body portion $6_1$ of the rotor 6 towards the boss member 5, with the magnetic flux due to the second annular exciting coil 13 flowing, for example, through the extension $6_2$ of the rotor 6 toward the second casing member 12, the pole teeth 6b and 6c of the flat body portion $6_1$ of the rotor 6 are simultaneously magnetized in north and south polarities, while the pole teeth 6e and 6f of the extension $6_2$ are also magnetized simultaneously in south and north polarities as shown in FIG. 2, thus the rotor 6 initiating rotation through magnetic interference between the magnetic poles formed in the rotor 6 and the magnetic poles of the magnet stator 14.

The two-phase electric motor of the above described fundamental construction may be applied to a two-phase synchronous motor, a reversible motor and a pulse motor, the detailed construction for each of which motors will be described hereinbelow with reference to FIGS. 5(a) to 13.

(1) Two-phase synchronous motor: The pole teeth 6b and 6c of the flat body portion $6_1$ and the pole teeth 6e and 6f of the extension $6_2$ of the rotor 6 are formed in relative positions where the electrical angle therebetween is kept at 0°, while the first and second annular coils 10 and 13 are connected in parallel with respect to the power source (FIG. 4). Since the areas of the pole teeth 6b and 6c of the rotor 6 are not the same as those of the pole teeth 6e and 6f, variable resistors $R_1$ and $R_2$ are connected in series to the exciting coils 10 and 13 respectively for controlling the magnetic fields produced by the exciting coils 10 and 13, thereby to match the magnetic interferences between the pole teeth 6b and 6c and the magnetized face $14_1$ and between the pole teeth 6e and 6f and the magnetized face $14_2$ to each other.

Referring to FIGS. 5(a) to 5(e), in a stationary position, the rotor 6 is located in such a position that the magnetic circuit from the respective north poles to the south poles on the upper face $14_1$ and the peripheral face $14_2$ of the magnet stator 14 contains a minimum magnetic reluctance, so that the pole teeth 6b and 6c, and 6e and 6f are positioned midway between adjacent north and south poles of the magnet stator 14 to stride over the latter as shown in FIG. 5(a).

It should be noted here that since the rotor 6 is positioned over the magnet stator 14, with the upper flat face $14_1$ and the peripheral face $14_2$ of the magnet stator 14 facing the corresponding flat body portion $6_1$ and the peripheral extension $6_2$ of the rotor 6, the relation therebetween is shown in a simplified form in diagrams of FIGS. 5(a) to 5(e), and that similar diagrams shown hereinbelow are simplified in the same manner.

Upon application of commercial frequency voltages to the first exciting coil 10 and the second exciting coil 13, currents flowing therethrough are of the same phase, with the corresponding two magnetic circuits established thereby being exactly in the same electrical condition. In this instance, if the pole teeth 6b and 6e of the rotor 6 are magnetized in north polarity and the pole teeth 6c and 6f of the same rotor 6 are magnetized in south polarity, the pole teeth 6b and 6e are repelled by the north poles of the permanent magnet 14 and attracted by the adjacent south poles thereof, while the pole teeth 6c and 6f are repelled by the south poles of the permanent magnet 14 and attracted by the adjacent north poles thereof to run said rotor 6 in a direction of an arrow A. The pole teeth 6b and 6e, and 6c and 6f advance to the respective positions as shown in FIG. 5(b) before the given half cycle of the power supply frequency has been over, gaining a moment of inertia. In the following half cycle, the pole teeth 6b and 6e assume a south polarity and the pole teeth 6c and 6f assume a north polarity as shown in FIG. 5(c) and advance to the position of FIG. 5(c) through strong magnetic interferences between the confronting magnetic faces. Likewise, said pole teeth 6b and 6e, and 6c and 6f advance to the positions of FIG. 5(d) and then to the positions of FIG. 5(e), making the rotation surely and positively synchronizing with the power supply frequency.

In case the reversed polarities are induced in the pole teeth at the start, the rotor 6 run in the reverse direction.

(2) Reversible synchronous motor: The pole teeth 6b and 6c of the circular flat body portion $6_1$ and the pole teeth 6e and 6f of the extension $6_2$ of the rotor 6 are so formed that the respective pole teeth are staggered from each other by an electrical angle of 96° to 120°, while the first exciting coil 10 and the second exciting coil 13 are connected as shown in FIG. 6. Stated illustratively, the exciting coils 10 and 13 are coupled in parallel with each other and connected to the A.C. power supply through a switch means SW and a capacitor C is connected between the exciting coils 10 and 13, with variable resistors R3 and R4 being connected in series to the exciting coils 10 and 13 respectively for similar purpose in the two-phase synchronous motor mentioned earlier. The waveforms of currents flowing through said exciting coils 10 and 13 are shown in FIG. 7, in which (I) represents a waveform of a current flowing through the first exciting coil 10, (II) a waveform of a current flowing through the second exciting coil 13 when the switch SW is in a position of a solid line and (III) a waveform of a current flowing through said second exciting coil 13 when the switch SW is switched to a position of a dotted line of FIG. 6, from which it is seen that the phase of the current flowing through the exciting coil to which the capacitor C is connected is leading.

Figure 8A:
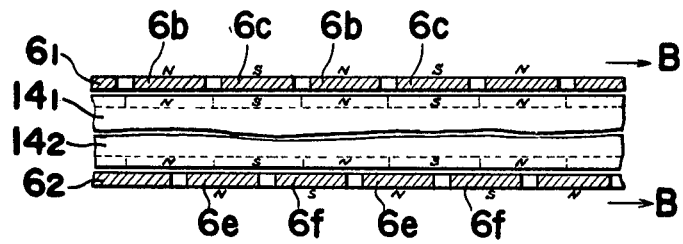

When the switch SW is in the position shown by the solid line in FIG. 6, the current of waveform (I) flows through the first exciting coil 10 and the current of waveform (II) flows through the second exciting coil 13 as mentioned above. In the instance of (I-O) in FIG. 7, the current flowing through the first exciting coil 10 is positive, with the pole teeth 6b and 6c of the rotor 6 being magnetized, for example, in north and south polarities, respectively. On the other hand, the current flowing through the second exciting coil 13 is negative and a north and a south polarity are induced respectively in the pole teeth 6e and 6f on the peripheral face $6_2$ of the rotor 6 as shown in FIG. 8(a).

In a rest position, the pole teeth 6b and 6c of the rotor 6 are positioned over the north and the south poles on the upper face $14_1$ of the permanent magnet 14, respectively and the pole teeth 6e and 6f of the rotor 6 are positioned midway between adjacent north and south poles on the peripheral face $14_2$ of the permanent magnet stator 14. Under this condition, a repelling force is exerted on the flat body portion $6_1$ of the rotor 6. This repelling force, however, does not act to determine the rotational direction since the pole teeth 6b and 6c are positioned centrally over the poles of the permanent magnet 14. On the other hand, both of a repulsion force and an attraction force are exerted on the rotor 6 because its pole teeth 6e and 6f rest approximately midway between the poles on the peripheral face $14_2$ of the magnet 14. Due to these forces exerted on said rotor 6, the rotor 6 starts to rotate in a direction of an arrow B and gains a moment of inertia.

Figure 8B:
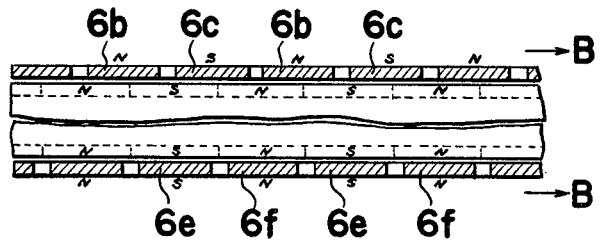
Figure 8C:
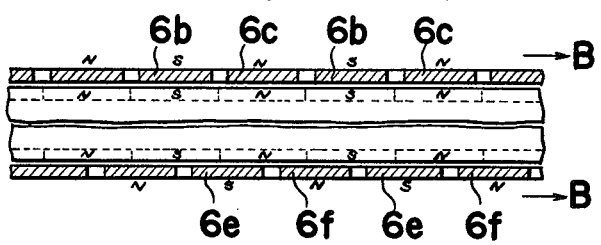
Figure 8D:
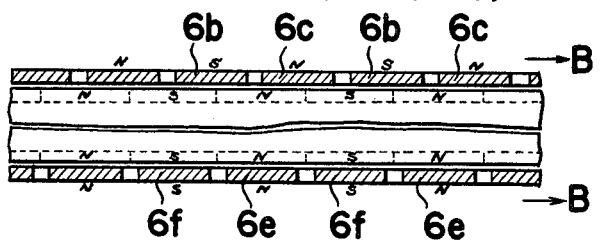
Figure 8E:
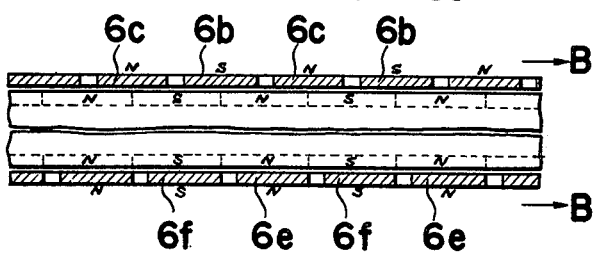

The pole teeth 6e and 6f of the rotor 6 then advance to positions crossing the south poles and the north poles on the peripheral face $14_2$ of the permanent magnet 14, respectively, until at a phasic position of (II-O) of FIG. 7, the current (II) flowing through the second exciting coil 13 has become positive, inverting the polarities of the pole teeth 6e and 6f on the extension $6_2$ of the rotor 6 to south and north, respectively as shown in FIG. 8(b). Said rotor 6, therefore, is subjected to repulsion between the peripheral face $14_2$ of the permanent magnet 14 and the pole teeth 6e or 6f. At this time, however, a maximum positive current still flows through the first exciting coil 10 and the pole teeth 6b and 6c on the flat body portion $6_1$ of the rotor 6 are kept in a north and a south polarity stronger than those of the second exciting coil 13. Accordingly, the rotation is further made in the direction of arrow B due to the magnetic interference between the flat body portion $6_1$ of the rotor 6 and the upper face $14_1$ of the permanent magnet 14 as shown in FIG. 8(b). When the pole teeth 6e and 6f on the extension $6_2$ of the rotor 6 pass the center of the respective poles on the peripheral face $14_2$ of the permanent magnet 14, they get repulsion force to afford the rotor assembly a large rotational torque in cooperation with the attracting force of the pole teeth 6b and 6c on flat body portion $6_1$ of the rotor 6. At phasic positions of (I-1), (II-1) and (I-2), of FIG. 7 also, the rotor assembly is brought into positions of FIGS. 8(c), 8(d) and 8(e), respectively through analogous magnetic operation. Thus, the rotor assembly continues to run in the direction of arrow B through every inversion in the polarities of the pole teeth 6b and 6c or 6e and 6f of the rotor 6 depending upon the inversion in the polarities of the currents flowing through the first exciting coil 10 and the second exciting coil 13.

In case the switch SW is turned to the position of the dotted line, the current of waveform (III) of FIG. 7 flows through the second exciting coil 13 as mentioned before. At the phasic position of (I-0) of FIG. 7, the current flowing through the first exciting coil 10 is being turned to be positive and the current flowing through the second exciting coil 13 is positive so that north and south poles are induced in the pole teeth 6b and 6c on the flat body portion 6₁ of the rotor 6, respectively and south and north poles in the pole teeth 6e and 6f on the extension 6₂ of the rotor 6, respectively as shown in FIG. 9(a).

As a result, the rotor 6 begins to rotate in a direction of an arrow C (opposite to the direction of FIG. 8) by the attraction between the extension 6₂ of the rotor 6 and the peripheral face 14₂ of the permanent magnet 14. When the pole teeth 6b and 6c of the rotor 6 are then brought, to any extent, into positions offset from the north poles and the south poles on the upper face 14₁ of the permanent magnet stator 14, respectively, repulsion is exerted therebetween to act to continue the rotation in the direction of arrow C in cooperation with the above mentioned attraction, imparting a moment of inertia to the rotor 6. Likewise, the rotor 6 makes further rotation in a manner analogous with the case of FIG. 8 as shown in FIGS. 9(b) to 9(e). Thus, the present reversible motor is capable of selectively reversing its rotation by operation of the switch means SW.

(3) Pulse motor: The pole teeth 6b and 6c of the circular flat body portion 6₁ and the pole teeth 6e and 6f of the extension 6₂ of the rotor 6 are so arranged that an electrical angle between the respective pole teeth is 90°, while intermediate taps 10b and 13b are provided on the first exciting coil 10 and the second exciting coil 13, respectively to form substantially four exciting coils as shown in FIG. 10. Input signals to be applied across the taps of the first exciting coil 10 and the second exciting coil 13 are selected through a drive circuit 19, to which drive circuit 19, an electric power and a control signal are applied through terminals 20 and 21. Variable resistors R5 and R6 are inserted in the taps 10b and 13b for similar purpose as in the two-phase synchronous motor mentioned earlier. Said drive circuit 19 is adapted to produce exciting pulse signals to be applied to the first exciting coil 10 and the second exciting coil 13 as shown in FIG. 11 in response to the control signal applied through the terminals 21. In FIG. 11, (I) represents a waveform of a pulse voltage to be applied across the taps 10a and 10b of the first exciting coil 10, (II) a waveform of a pulse voltage to be applied across the taps 10b and 10c of the coil 10, (III) a waveform of a pulse voltage to be applied across the taps 13a and 13b of the second exciting coil 13 and (IV) a waveform of a pulse voltage to be applied across the taps 13b and 13c of the coil 13. Upon application of these pulse voltages to the first exciting coil 10 and the second exciting coil 13, the pole teeth 6b and 6c and the pole teeth 6e and 6f of the rotor 6 are magnetized as shown in Table I. Table I is based upon the case where positive pulse voltages are applied. Then, in case negative pulse voltages are applied, the polarities induced become reverse.

Table I

| energization conditions of exciting coils | polarities induced in pole teeth | | | |
|---|---|---|---|---|
| | 6b | 6c | 6e | 6f |
| 10b − 10a + ON | N | S | — | — |
| 10b − 10c + ON | S | N | — | — |
| 13b − 13a + ON | — | — | N | S |
| 13b − 13c + ON | — | — | S | N |

In FIG. 11, operational regions are expressed on the abscissa and critical points in operation are represented by a, b, c, d -----. Said critical points form respective operational regions such as region a - b, region b - c, region c - d, region d - a' and so on.

The operations of the exciting coils and the magnetized conditions of the pole teeth are summarized in the following based upon Table I.

In region a - b (FIG. 11): at the point a, a positive pulse voltage starts to be applied across the taps 10b and 10a of the first exciting coil 10 to induce north and south poles in the pole teeth 6b and 6c on the flat body portion 6₁ of the rotor 6, respectively while a positive pulse voltage is being applied across the taps 13b and 13c of the second exciting coil 13, magnetizing the pole teeth 6e and 6f on the peripheral face 6₂ of the rotor 6 in south and north polarities, respectively until the point b.

In region b - c: the first exciting coil 10 is kept energized across the taps 10b and 10a until the point c, while the second exciting coil 13 is newly applied across the taps 13b and 13a with a positive pulse voltage to induce north and south poles in the pole teeth 6e and 6f on the extension 6₂ of the rotor 6, respectively.

In region c - d: a pulse voltage is newly applied across the taps 10b and 10c of the first exciting coil 10 to magnetize the pole teeth 6b and 6c on the flat body portion 6₁ of the rotor 6 in south and north poles, respectively while the second exciting coil 13 is kept energized across the taps 13b and 13a until the point d.

In region d - a': the first exciting coil 10 are kept energized across the taps 10b and 10c until the point a' while the second coil 13 are newly applied across the taps 13b and 13c with a positive pulse voltage to magnetize the pole teeth 6e and 6f on the extension 6₂ of the rotor 6 in south and north polarities, respectively.

Thus, through these operational regions two of the four exciting coils are in an energized condition and through repitition of the operation as mentioned above, the rotor 6 continue to run. These operations are further summarized in Table II.

Table II

| operational region | conditions of exciting coils | | | | polarities induced in pole teeth | | | |
|---|---|---|---|---|---|---|---|---|
| | 10b− 10a | 10b− 10c | 13b− 13a | 13b− 13c | 6b | 6c | 6e | 6f |
| a - b | + | − | − | + | N | S | S | N |
| b - c | + | − | + | − | N | S | N | S |
| c - d | − | + | + | − | S | N | N | S |
| d - a' | − | + | − | + | S | N | S | N |
| a' - b' | + | − | − | + | N | S | S | N |
| b' - c' | + | − | + | − | N | S | N | S |

The rotational operation of the thus magnetized pole teeth 6b and 6c, and 6e and 6f of the rotor 6 is explained hereunder referring to the operation diagram of FIGS. 12(a) to 12(e), the pulse voltage as shown in FIG. 11 and the magnetized condition of the pole teeth as shown in Table II.

FIG. 12(a) shows a condition before the point a of FIG. 11 wherein the pole teeth 6b and 6c on the flat body portion 6₁ of the rotor 6 are magnetized in south and north, respectively, while the pole teeth 6e and 6f on the extension 6₂ of the rotor 6 are magnetized in south and north, respectively. In this condition, the pole teeth 6b and 6c get a repulsion and an attraction force in the rightward direction as viewed in FIG. 12 and on the other hand, the pole teeth 6e and 6f of the rotor 6 receive a repulsion and an attraction force in the leftward direction. Accordingly, the rotor 6 fixed to the boss member 5 are in a dynamically balanced position and can not move in either direction, keeping the rotary shaft 2 to stand still.

In the region a - b of FIG. 11, a pulse voltage is applied across the taps 10b and 10a of the first exciting coil 10 at the point a and a pulse voltage is still applied across the taps 13b and 13c of the second exciting coil 13. The pole teeth 6b and 6c on the flat body portion 6₁ of the rotor 6, then, change their polarities to those in the parentheses in FIG. 12(a). As a result, the flat body portion 6₁ of the rotor 6 advances in the leftward direction through the attraction by the upper face 14₁ of the permanent magnet 14, while the extension 6₂ of the rotor 6 rotates in the same direction due to the replusion by the peripheral face 14₂ of said permanent magnet 14 by ½ pole pitch of the permanent magnet 14. The rotor 6 then reaches dynamically balanced position and stalls in the positions as shown in FIG. 12(b).

In the region b - c, the second exciting coil 13 are de-energized between the taps 13b and 13c but energized by a pulse voltage newly applied across the taps 13b and 13a, while the first coil 10 is still energized across the taps 10b and 10a at the point b. The polarities of the pole teeth 6e and 6f on the extension 6₂ of the rotor 6 are then changed to those in the parentheses as shown in FIG. 12(b). Accordingly, the flat body portion 6₁ of the rotor 6 runs in the leftward direction due to the attraction by the permanent magnet 14, while the extension 6₂ of the rotor 6 rotates in the same direction due to the repulsion by said permanent magnet 14 by further ½ pole pitch of the permanent magnet 14 to dynamically balanced stable positions where the rotor 6 stalls as shown in FIG. 12(c).

In the region c - d, the first exciting coil 10 is de-energized between the taps 10b and 10a but energized by a pulse voltage newly applied across the taps 10b and 10c at the point c, while the second exciting coil 13 is still energized across the taps 13b and 13a at the point c so that the pole teeth 6b and 6c on the flat body portion 6₁ of the rotor 6 changes their polarities to those in the parentheses as shown in FIG. 12(c). Accordingly, the flat body portion 6₁ of the rotor 6 rotates in the leftward direction due to the repulsion by the upper face 14₁ of the permanent magnet 14, while the extension 6₂ of the rotor 6 rotates in the same direction through the attraction by the peripheral face 14₂ of said permanent magnet 14 by further ½ pole pitch of the permanent magnet 14. At the positions, the rotor 6 stalls in dynamically balanced stable condition as shown in FIG. 12(d).

In the region d - a', the polarities of the extension 6₂ of the rotor 6 are changed through similar operation to those in the parentheses as shown in FIG. 12(d) and the rotor 6 further advances by ½ pole pitch of the permanent magnet 14 to stall in dynamically balanced stable positions as shown in FIG. 12(e). Likewise, the rotor 6 advances in the leftward direction step by step by ½ pole pitch of the permanent magnet 14.

In order to rotate the rotor 6 in the opposite direction, i.e., toward rightward direction, the pulse voltage (III) of FIG. 10 is applied across the taps 10b and 10a of the first exciting coil 10 and the pulse voltage (IV) is applied across the taps 10b and 10c, while the pulse voltage (I) and the pulse voltage (II) are applied across the taps 13b and 13a and the taps 13b and 13c, respectively. The energization operation and the magnetization operation under these conditions are shown in Table III and the resultant operation of the rotor 6 is shown in FIGS. 13(a) to 13(e).

Table III

| operational region | conditions of exciting coils | | | | polarities induced in pole teeth | | | |
|---|---|---|---|---|---|---|---|---|
| | 10b−10a | 10b−10c | 13b−13a | 13b−13c | 6b | 6c | 6e | 6f |
| a − b | − | + | + | − | S | N | N | S |
| b − c | + | − | + | − | N | S | N | S |
| c − d | + | − | − | + | N | S | S | N |
| d − a' | − | + | − | + | S | N | S | N |
| a' − b' | − | + | + | − | S | N | N | S |
| c' − d' | + | − | + | − | N | S | N | S |

In the region a - b of FIG. 11, the second exciting coil 13 is de-energized between the taps 13b and 13c but energized by a pulse voltage applied across the taps 13b and 13a, while the first exciting coil 10 is energized by a pulse voltage applied across the taps 10b and 10c at the point a. The polarities of the pole teeth 6e and 6f on the extension 6₂ of the rotor 6 are then changed to those in the parentheses as shown in FIG. 13(a). As a result, the rotor 6 rotates in the rightward direction as viewed in FIG. 13 by ½ pole pitch of the permanent magnet 14. Then, the rotor 6 reaches dynamically balanced stable positions to stall there as shown in FIG. 13(b).

In the region b - c, the first exciting coil 10 is energized by a pulse voltage applied across the taps 10b and 10a, while the second exciting coil 13 is energized by a pulse voltage applied across the taps 13b and 13a at the point b. The polarities of the pole teeth 6b and 6c on the extension 6₁ of the rotor 6 are then changed to those in the parentheses as shown in FIG. 13(b). Accordingly, the rotor 6 advances and then stalls in positions as shown in FIG. 13(c).

In the region c - d, the second exciting coil 13 is energized by a pulse voltage applied across the taps 13b and 13c, while the first exciting coil 10 is energized by a pulse voltage applied across the taps 10b and 10a at the point c, so that the polarities of the pole teeth 6e and 6f on the extension 6₂ of the rotor 6 are changed to those in the parentheses as shown in FIG. 13(c). As a result, the rotor 6 rotates in the rightward direction and then stalls in the positions as shown in FIG. 13(d).

In the region d - a', the first exciting coil 10 is energized by a pulse voltage applied across the taps 10b and 10c, while the second exciting coil 13 is energized by a pulse voltage applied across the taps 13b and 13c at the point d. The polarities of the pole teeth 6b and 6c on the flat body portion 6₁ of the rotor 6 are then changed to those in the parentheses as shown in FIG. 13(d). Then, the rotor 6 is caused to rotate rightwardly to the positions as shown in FIG. 13(e). Thus, the rotor 6 continues to rotate step by step in the rightward direction through repitition of similar operation.

In the light of the foregoing description, every advance operation of the two-phase pulse motor is effected by distributing a pulse voltage to the four exciting coils according to necessity through the driving circuit 19 in response to every application of the input or control signal through the terminals 21. In this connection, it is to be noted that the input signal from the terminals 21 is not necessarily required to be a regular signal such as an AC sine-wave current or a constant and regular pulse signal. Even if the signal applied is occasionally constant or quick or occasionally intermittent or slow, the rotor of the present motor can surely advance by a pedetermined rotational angle depending upon the number of the input signals and stall in a position for a predetermined period.

Referring to FIG. 14, there is shown a modification of the rotor 6 of the invention. In this modification, the plurality of grooves 6a and 6d described as formed in the circular flat body portion 6₁ and the peripheral extension 6₂ of the rotor 6 to provide the pole teeth 6b and 6c, and 6e and 6f thereon are replaced by corresponding triangular openings 6a' and rectangular openings 6d' formed in the flat body portion 6₁' and the extension 6₂' of the rotor 6' respectively for providing similar pole teeth 6b' and 6c', and 6e' and 6a' thereon. Other construction and function of the rotor 6' is similar to those described with reference to FIGS. 1 to 13, so that detailed description thereof is abbreviated for brevity.

It should be noted here that part of the pole teeth described as employed in the rotor of the foregoing embodiments may be omitted without formation, and that the same pole teeth described to be of double polarities may be replaced by pole teeth of single polarity magnetizable either in south pole or north pole. The pole teeth in the peripheral extension of the rotor can be formed into ones of single polarity if replaced, for example, by pointed teeth.

It should also be noted that the difference in the electrical angle made through angular difference between the circular flat body portion and the peripheral extension of the rotor in the foregoing embodiments may be replaced by difference in electrical angle formed by staggering the magnetization of the north and south poles between the upper face and the peripheral face of the magnet stator.

It will be understood that though a two-phase synchronous motor, reversible motor and pulse motor are illustratively explained above, the motor of the present invention may of course be applicable to multi-phase motors of various types, in which case, the annular exciting coils may be increased in number corresponding to the number of the phases employed, while the magnetic stator is magnetized coaxially in a centrifugal direction in a plurality of stages corresponding to the number of the same phases, with the rotor being provided with pole teeth formed coaxially in the centrifugal direction in a plurality of stages also corresponding to the number of the phases for individually forming magnetic loops developed by respective annular exciting coils.

Furthermore, although self-explanatory from the foregoing description, the pole teeth for the rotor may either be formed in a centrifugal direction only on the circular flat body portion in a plurality of stages for forming the rotor in a disk-like configuration, or be formed in an axial direction of the rotor only on the peripheral extension of the rotor in a plurality of stages for making the rotor in a cylindrical shape, in the former case of which, the magnet stator may be magnetized coaxially in a centrifugal direction, only on the upper surface thereof, thus making it possible to form the motor rather thin or flat, while in the latter case, only the peripheral face of the magnetic stator is magnetized in the axial direction of the rotor in a plurality of stages, so that the motor can be formed in a shape rather long along the axis thereof.

As is clear from the foregoing description, according to the present invention, the electrical rotary machine includes a rotary shaft, a rotor made of a soft magnetic material on which the pole teeth are formed in a plurality of stages corresponding to the number of phases and which is fixed to the rotary shaft in a concentric relation therewith, a plurality of annular exciting coils corresponding in number to the number of the phases and provided at one side of the rotor in position corresponding to the position of the pole teeth at each of the stages of said rotor, a magnetic stator concentric with said rotary shaft and magnetized radially to provide north and south poles alternating at equal angular spacings in positions corresponding to the pole teeth of each of the stages of the rotor, with the magnetic stator being disposed at the other side of the rotor, and member of a soft magnetic material for causing magnetic flux developed by each of the annular exciting coils to form magnetic loops individually flowing through the pole teeth of each of the stages of the rotor.

Accordingly, since only one rotor is employed in the rotary electrical machine of the invention, the motor can be made thinner and consequently more compact than the two-phase motor having two rotors and can be manufactured more easily than the motor having two rotors because it is required in the latter that the angles between the pole teeth of the respective rotors be adjusted in the assembling of the motor, while in the former the pole teeth are accurately formed by molding or press eliminating such a necessity of adjustment, with possibilities of producing defective products being reduced to a large extent.

It is another advantage of the electrical rotary machine of the invention that the concept thereof is readily applicable to various types of motors as detailed in the foregoing description, depending on the use of the motors.

Although the present invention has been fully described by way of example with reference to the attached drawings, it is to be noted that various changes and modifications are apparent to those skilled in the art. Therefore, unless otherwise such changes and modifications depart from the scope of the present invention, they should be construed as included therein.

What is claimed is:

1. A plural phase electric motor comprising a rotary shaft rotatably supported in a housing, a rotor means of magnetic material having a flat body portion and a peripheral side portion secured to said shaft, a plurality of pole means at angularly spaced positions on said flat body and on said peripheral side portions, a permanent magnet stator means magnetized to provide north and south poles alternating at angular spacings corresponding to the angularly spaced positions of said pole means, a plurality of annular exciting coils corresponding in number to the number of phases of the motor, and a yoke member of magnetic material, said yoke member, exciting coils, stator means being so positioned relative to said rotor that magnetic fluxes developed by the exciting coils form respectively a magnetic loop together with the pole means of said flat body portion and a magnetic loop together with the pole means of said peripheral portion of said rotor.

2. A plural phase electric motor according to claim 1, wherein said stator means has only one magnet means, said magnet means being provided with north and south poles alternating at equal angle spacings.

3. A plural phase motor according to claim 1, wherein said rotor means is a single cup-shaped rotor member and said pole means are pole teeth formed at equal angular spacings by openings in said flat body portion and in said peripheral side portion.

4. A plural phase motor according to claim 3, wherein said stator means has a bevelled peripheral edge and is positioned concentrically within said cup-shaped rotor member with a first surface arranged parallel to said flat body portion of said rotor member, a second surface parallel to said peripheral side portion of said rotor member and said bevelled edge facing away from said flat body portion of said rotor member.

5. A plural phase motor according to claim 1, wherein said pole means are constituted by a plurality of pole teeth formed by openings on said flat body portion and by openings on said peripheral side portion, said body portion openings including a first set of alternating openings directed in a first direction and a second set of alternating openings directed in a second direction opposite to said first direction, and said side portion openings including a third set of alternating openings directed in a third direction and a fourth set of alternating openings directed in a fourth direction.

6. An electric motor which comprises a rotary shaft rotatably supported in a housing, a cup-shaped rotor of magnetic material having a flat body portion and a peripheral portion and coaxially secured to said rotary shaft, said flat body portion of said rotor having therein a plurality of pole teeth divided by openings provided at equal angular spacings and alternately formed so as to start from an inner edge and an outer edge of said flat body portion, said peripheral portion of said rotor also having therein a plurality of pole teeth divided by openings provided at equal angular spacings over the entire periphery thereof and alternately formed so as to start from a bent portion and an edge portion of said peripheral portion, a permanent magnet stator magnetized radially to provide north and south poles alternating at equal angular spacings in positions corresponding to positions of said pole teeth of said rotor respectively and disposed at one side of said rotor in a concentric relation with said rotor shaft, a plurality of annular exciting coils corresponding in number to the number of phases of said motor and disposed at the other side of said rotor in positions corresponding to positions of said pole teeth at said flat body portion and peripheral portion of said rotor, and a yoke member of magnetic material disposed in such a manner that magnetic fluxes developed by said annular exciting coils form respectively a magnetic loop together with said pole teeth of said flat body portion and a magnetic loop together with said pole teeth of said peripheral portion of said rotor.

7. An electric motor as claimed in claim 6, wherein said pole teeth of said rotor are constituted by first L-shaped openings formed alternately so as to start from inner and outer edges of said flat body portion and second L-shaped openings formed alternately so as to start from said bent portion and edge portion of said peripheral portion.

8. An electric motor as claimed in claim 6, wherein said pole teeth of said rotor are constituted by triangular openings formed alternately so as to start from inner and outer edges of said flat body portion and rectangular openings formed alternately so as to start from said bent portion and edge portion of said peripheral portion.

9. An electric motor as claimed in claim 6, wherein said annular exciting coils are two in number which constitute two sets of independent magnetic loops, said yoke member being disposed between each of said two annular exciting coils to form one of said magnetic loops surrounding one of said annular exciting coils together with said pole teeth of said flat body portion of said rotor, and the other of said magnetic loops surrounding the other of said annular exciting coils together with said pole teeth of said peripheral portion of said rotor, said pole teeth of said flat body portion and peripheral portion of said rotor being staggered in electrical phasial positions by a predetermined electrical angle.

* * * * *